UNITED STATES PATENT OFFICE 2,690,382

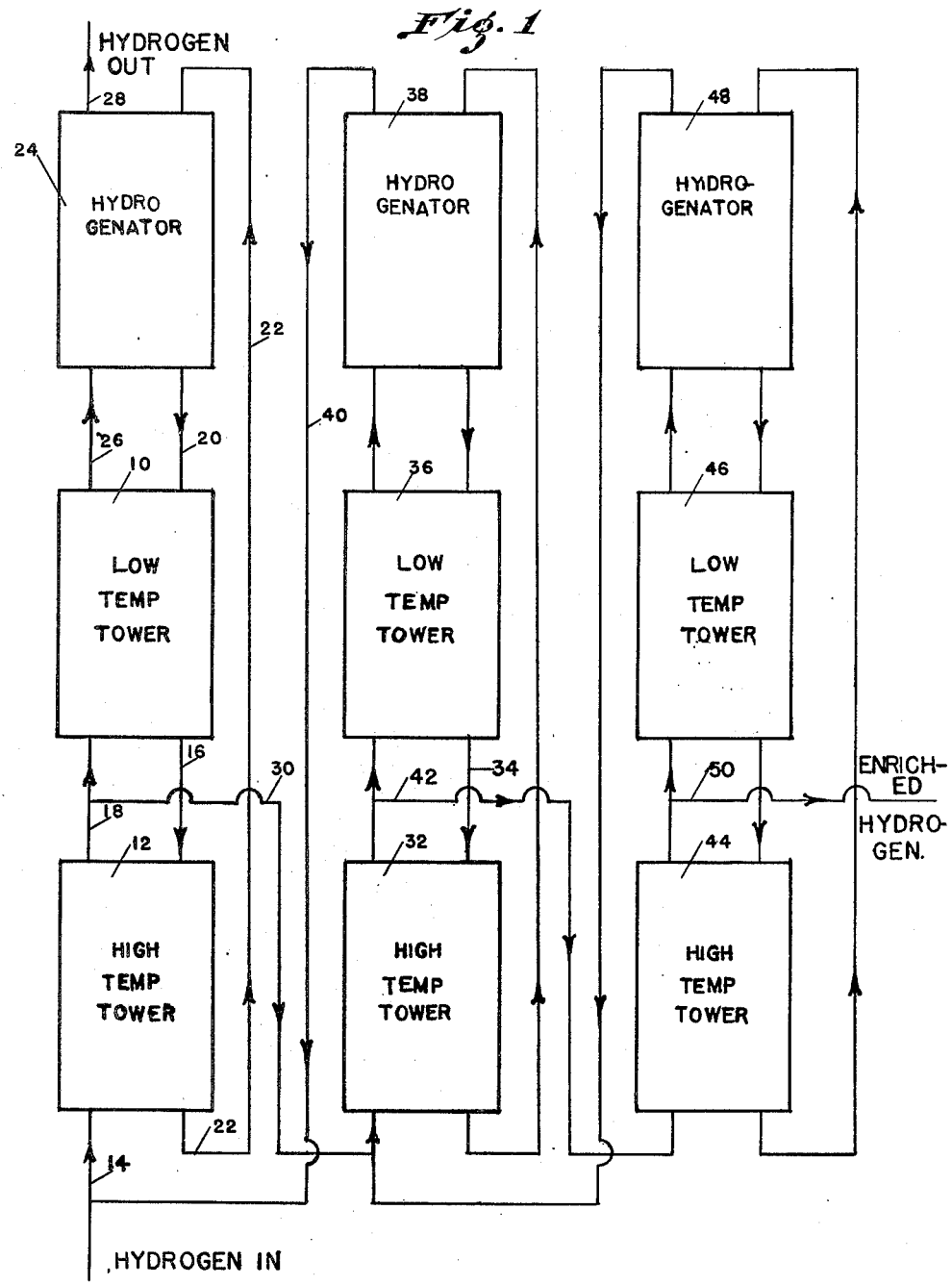

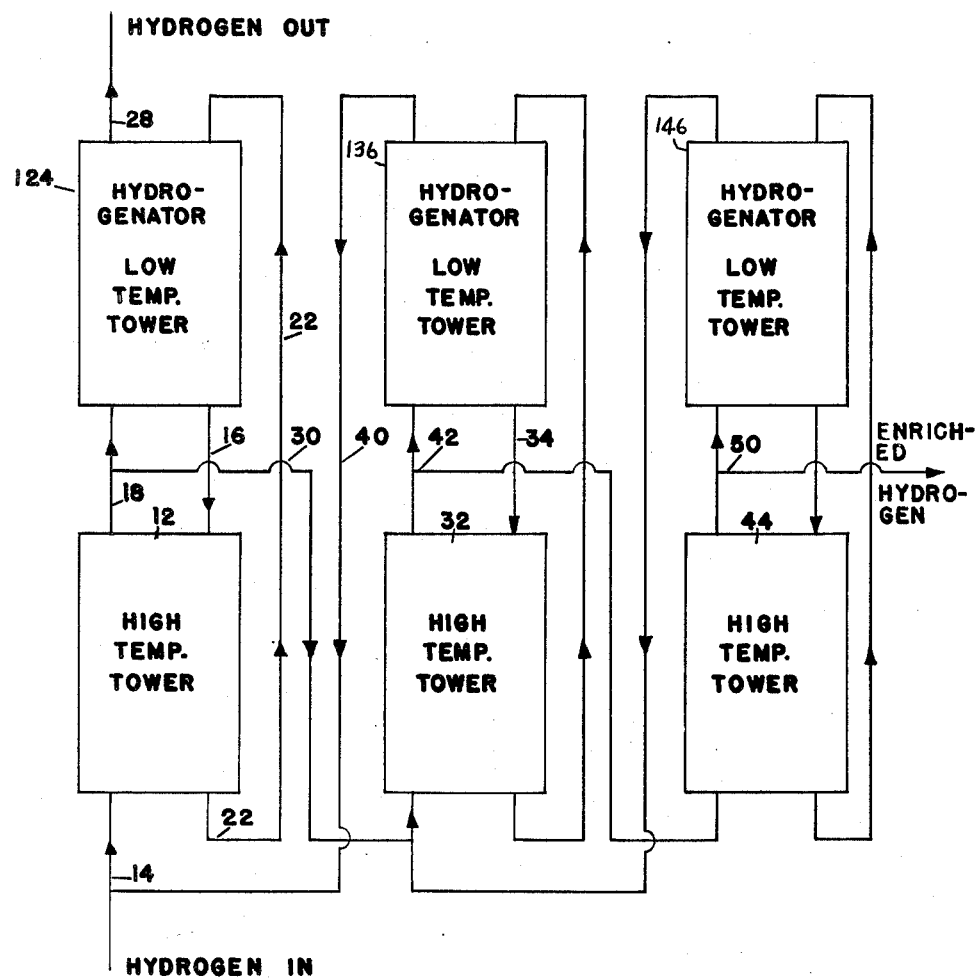

DUAL TEMPERATURE ISOTOPE EXCHANGE PROCESS

George G. Joris, Princeton, N. J., assignor to the United States of America as represented by the United States Atomic Energy Commission Application May 28, 1945, Serial No. 596,224

6 Claims. (Cl. 23—210)

This invention relates to isotope concentration and more particularly to an improved method of concentrating deuterium in cyclohexane and hydrogen by utilizing a hydrogen isotope exchange reaction between cyclohexane and hydrogen containing deuterium.

It is an object of the present invention to provide an improved process for concentrating deuterium in a substance such as hydrogen in which it occurs naturally.

It is another object of the invention to provide an improved method of concentrating deuterium by utilizing the hydrogen isotope exchange reaction between cyclohexane and hydrogen.

It is still another object of the invention to provide a method of utilizing this exchange reaction in a manner that is more economical than the methods previously proposed and is capable of giving enrichment equivalent to that previously obtainable but with a smaller number of exchange units.

Other object of the invention will be in part obvious and in part pointed out hereinafter.

In one of its broader aspects the method of the invention comprises the steps of establishing a countercurrent flow of cyclohexane and hydrogen in a countercurrent system comprising at least two exchange units, mixing the cyclohexane and hydrogen intimately in each of the exchange units to cause an exchange of hydrogen isotopes between the two substances and maintaining the two exchange units at different temperatures to produce a different distribution of deuterium between the cyclohexane and hydrogen in the two exchange units. By operating in this manner it has been found that in the colder unit cyclohexane will be enriched with respect to deuterium to a greater extent than in the hotter unit. Since there is a countercurrent flow of cyclohexane and hydrogen in the two units the effect of the dual temperature operation will be to cause the cyclohexane to pick up deuterium from the hydrogen in the colder unit and to give up deuterium to the hydrogen in the hotter unit. Thus the concentration of deuterium in the cyclohexane and hydrogen will tend to be relatively high at points between the two exchange units.

As conducive to a clearer understanding of the present invention it may be pointed out that when cyclohexane and hydrogen are mixed in the presence of a suitable catalyst a hydrogen isotope exchange reaction tends to occur in accordance with the following equation.

$$C_6H_{12} + HD \rightleftharpoons C_6H_{11}D + H_2$$

As indicated by this equation there is an equilibrium distribution of deuterium between the cyclohexane and hydrogen which may be represented as follows:

$$K = \frac{C_6H_{11}D/C_6H_{12}}{HD/H_2}$$

wherein $C_6H_{11}D/C_6H_{12}$ = the molal ratio of the deuterium-containing species to the non-deuterium-containing species of cyclohexane.

$HD/H_2$ = the molal ratio of the deuterium-containing species to the non-deuterium-containing species of hydrogen, and $K$ = a constant at any given temperature.

At small concentrations of deuterium the constant K may be considered to be the distribution ratio of deuterium between cyclohexane and hydrogen. If, for example, K has a value of 3 this means that the cyclohexane contains about three times as great a concentration of deuterium as does the hydrogen in isotopic equilibrium therewith.

The relative concentrations of deuterium in cyclohexane and hydrogen when they are mixed depend upon both the rate of the exchange reaction and the equilibrium distribution, and both reaction rate and equilibrium distribution vary with temperature. The reaction rate of the exchange reaction increases with increasing temperature and vice versa. The relationship between equilibrium distribution of deuterium and temperature is indicated in the following table:

Table

| Temp. in ° C.: | K |
|---|---|
| 110 | 3.0 |
| 157 | 2.5 |
| 184 | 2.3 |
| 310 | 1.44 |
| 350 | 1.30 |

It is apparent that the tendency of deuterium to concentrate in cyclohexane varies inversely as the temperature whereas the reaction rate of the exchange reaction varies directly with the temperature. It has been found that the exchange reaction is preferably carried out at temperatures of the order of 100° C. to 300° C.

Various catalysts may be used to catalyze the exchange reaction, preferred catalysts being active nickel catalysts and a catalyst comprising an activated cocoanut charcoal having 2½% by weight of finely divided platinum metal deposited thereon. Other catalysts that may be used include heavy metal chromite catalysts.

Apparatus for carrying out the present method is illustrated in the accompanying drawings in which parts having the same functions are numbered alike. In the drawings, Figure 1 is a diagrammatic flow sheet illustrating a preferred embodiment of the invention in which individual units for the low-temperature exchange and for the hydrogenation are employed, and Figure 2 is a diagrammatic flow sheet illustrating another embodiment of the invention in which a single unit is employed in each cycle to perform both the functions of hydrogenation and of low-temperature exchange.

Apparatus capable for carrying out the preferred embodiment of the present method is shown in Figure 1. The apparatus shown in Figure 1 comprises in general a plurality of pairs of high and low temperature exchange units interconnected in a countercurrent system for concentrating deuterium in hydrogen. Referring to Figure 1 the numerals 10 and 12 designate exchange units which are desirably in the form of packed towers of the type commonly used in the art of fractional distillation. Hydrogen containing, for example, the natural abundance of deuterium is fed through a pipe 14 to the bottom of the high temperature tower 12 and flows up through the tower countercurrently to and in intimate contact with downwardly flowing cyclohexane that enters the top of tower 12 through pipe 16. Hydrogen from the top of high temperature tower 12 flows through pipe 18 to the bottom of low temperature tower 10 and flows up through tower 10 in contact with downwardly flowing cyclohexane that enters the top of tower 10 through pipe 20. Deuterium-enriched cyclohexane from the bottom of tower 10 flows through pipe 16 to the top of tower 12.

The tower 10 is maintained at a relatively low temperature, for example 100° C., to cause a hydrogen isotope exchange reaction between the cyclohexane and hydrogen within the tower that is of such a character as to enrich the cyclohexane and deplete the hydrogen with respect to deuterium. The enriched cyclohexane passes to the high temperature tower 12 which is maintained at a relatively higher temperature, for example 250° C., to cause the cyclohexane to give up a part of its deuterium to the countercurrently flowing hydrogen and also to cause the cyclohexane to be decomposed into benzene and hydrogen. It is evident that the towers 10 and 12 operate at a temperature above the normal boiling point of benzene and cyclohexane, and the exchange system is desirably operated at a relatively high pressure, say 100 atmospheres, to keep the benzene and cyclohexane in the liquid state. The hydrogen formed as a result of the decomposition of the cyclohexane mixes with the fresh hydrogen entering the high temperature tower and the benzene formed as a result of the decomposition is hydrogenated to form cyclohexane which is recycled.

Benzene leaves high temperature tower 12 through pipe 22 and flows to a hydrogenator 24 where it is brought into contact with deuterium-depleted hydrogen from the low temperature tower 10. The hydrogen flows from tower 10 to hydrogenator 24 through a pipe 26. Hydrogenation of the benzene within the hydrogenator 24 is effected in the presence of a catalyst at a temperature of about 100° C. Nickel and platinum catalysts of the type referred to above may be used to catalyze the hydrogenation reaction. The cyclohexane formed flows through pipe 20 to the low temperature tower 10. Hydrogen in the excess of that required to react with benzene to form cyclohexane leaves the hydrogenator 24 through pipe 28.

The hydrogen isotope exchange reaction between cyclohexane and hydrogen and the reaction between hydrogen and benzene to form cyclohexane may be carried out under substantially the same conditions. These conditions are, of course, determined by the equilibrium constants and the rates of the reactions. As indicated above and in the art of hydrogenation, these constants are variable in the same ranges of temperature and pressure and their kinetics are altered by the same catalysts. For example, at 100° C. under a pressure of about 100 atmospheres in the presence of an active nickel catalyst or a catalyst comprising an activated cocoanut charcoal with 2½ per cent by weight of finely divided platinum nickel deposited thereon, both the hydrogenation of benzene and the hydrogen-cyclohexane exchange reaction may be carried out favorably to applicant's method. Thus the hydrogenator 24 and the low temperature tower 10 may be combined in a single unit with the reactions taking place in different zones or even in the same zone in the combined unit. It must be kept in mind, however, that the hydrogen-benzene hydrogenation (or dehydrogenation) reaction and the hydrogen-cyclohexane exchange reaction are both equilibrium reactions so that conditions may be chosen to favor one or the other of the reactions. This embodiment, in which a single unit combines the functions of hydrogenator and low-temperature exchange tower, is illustrated in Figure 2 wherein the parts are numbered to correspond to the functions of the parts described with reference to Figure 1. In Figure 2 the units indicated by reference numerals 124, 136 and 148 combine, in the corresponding stages, the functions of the hydrogenators 24, 38 and 48, respectively, and of the low temperature towers 10, 36 and 46, respectively, of Figure 1. Other than the combination of hydrogenator and low temperature exchange in a single unit in each stage, the process illustrated in Figure 2 is the same as that illustrated in Figure 1.

It is apparent that in the apparatus so far described with reference to Figure 1 the cyclohexane and benzene formed a closed cycle and that hydrogen containing a normal abundance of deuterium is admitted at one point in the system and hydrogen relatively depleted with respect to deuterium is removed at another point in the system. The operation is such that cyclohexane is enriched as it passes through the low temperature tower 10 and therefore cyclohexane having the highest concentration of deuterium is found in the pipe 16 as well as near the bottom of low temperature tower 10 and near the top of high temperature tower 12. Similarly hydrogen containing the highest concentration of deuterium is found in the pipe 18 as well as in the lower portion of tower 10 and upper portion of tower 12. Enriched product may be obtained either by withdrawing cyclohexane from pipe 16 or hydrogen from pipe 18. However since the enrichment obtained in a single pair of exchange units is usually relatively small it is ordinarily desirable to interconnect a plurality of pairs of exchange units in a concentrating system as indicated in Figure 1 (and Figure 2).

Referring further to Figure 1 enriched hydrogen is withdrawn from pipe 18 through pipe 30 and flows to the bottom of high temperature tower 32 thence upward through the tower 32 countercurrent to downwardly flowing cyclohexane which enters through pipe 34. The hydrogen from high temperature tower 32 passes successively through low temperature tower 36 and hydrogenator 38 and then is returned through pipe 40 to the fresh hydrogen pipe 14 and high temperature tower 12. The high temperature tower 32, low temperature tower 36 and hydrogenator 38 are similar respectively to the towers 12 and 10 and hydrogenator 24 and operate in a similar manner and under similar conditions.

Hydrogen that is still further enriched with respect to deuterium is withdrawn from between the second pair of towers 32 and 36 through a pipe 42 and flows to the third pair of towers 44 and 46 and to the hydrogenator 48 wherein it is still further enriched with respect to deuterium. The enriched hydrogen withdrawn through pipe 50 between the towers 44 and 46 may be caused to pass through additional pairs of exchange towers until the desired degree of enrichment has been attained. It is apparent that each pair of towers is associated with a closed cyclohexane-benzene cycle and that enriched hydrogen is fed from each pair of exchange units to the next successive pair of units and depleted hydrogen returned from each pair of units to the next preceding pair of units.

It is of course to be understood that the foregoing description is illustrative only and that many changes might be made in the embodiments of the invention described and illustrated without departing from the spirit of the invention. Thus the concentrating system illustrated in the drawings might be modified to provide a closed hydrogen cycle associated with each pair of exchange towers and enriched cyclohexane might be advanced from each pair of towers to the next pair, fresh cyclohexane being fed continuously to the first pair of towers of the system.

The exchange system need not be operated at a pressure of 100 atmospheres but may also be operated, with slight modifications, at atmospheric pressure. When operating at low pressures the towers 10 and 12 and hydrogenator 24 contain a mixture of hydrogen and the vapors of cyclohexane and/or benzene. The vapor mixture leaving each tower is cooled by appropriate heat exchangers to condense and separate the cyclohexane and/or benzene and the liquid cyclohexane and/or benzene is re-vaporized before it enters the next tower. The flow from tower to tower is as indicated in the drawings. Other changes will be evident to those skilled in the art.

I claim:

1. The method of concentrating deuterium in one of the two substances cyclohexane and hydrogen by a hydrogen isotope exchange reaction between said two substances comprising the steps of establishing a countercurrent flow of cyclohexane and hydrogen through at least two exchange units, mixing said cyclohexane and hydrogen intimately in each of said units to cause an exchange of hydrogen isotopes between said two substances, maintaining one of said exchange units at a relatively low temperature to cause the cyclohexane flowing therethrough to be enriched with respect to deuterium, maintaining the other of said exchange units at a relatively high temperature to cause the hydrogen passing therethrough to be enriched with respect to deuterium and also to decompose the cyclohexane passing therethrough into benzene and hydrogen and withdrawing as product deuterium-enriched hydrogen leaving the hotter of said two exchange units.

2. The method of concentrating deuterium in one of the two substances cyclohexane and hydrogen by a hydrogen isotope exchange reaction between said two substances comprising the steps of establishing a countercurrent flow of cyclohexane and hydrogen through at least two exchange units, mixing said cyclohexane and hydrogen intimately in each of said units to cause an exchange of hydrogen isotopes between said two substances, maintaining one of said exchange units at a relatively low temperature to cause the cyclohexane flowing therethrough to be enriched with respect to deuterium, maintaining the other of said exchange units at a relatively high temperature to cause the hydrogen passing therethrough to be enriched with respect to deuterium and also to decompose the cyclohexane passing therethrough into benzene and hydrogen, hydrogenating the benzene leaving the hotter of said exchange units to form cyclohexane, returning said last named cyclohexane to said colder unit and withdrawing as product a part of the enriched hydrogen leaving said hotter unit.

3. The method of concentrating deuterium in one of the two substances cyclohexane and hydrogen by a hydrogen isotope exchange reaction between said two substances comprising the steps of establishing a countercurrent flow of cyclohexane and hydrogen through at least two exchange units, mixing said cyclohexane and hydrogen intimately in each of said units to cause an exchange of hydrogen isotopes between said two substances, maintaining one of said exchange units at a relatively low temperature to cause the cyclohexane flowing therethrough to be enriched with respect to deuterium, maintaining the other of said exchange units at a relatively high temperature to cause the hydrogen passing therethrough to be enriched with respect to deuterium and also to decompose the cyclohexane passing therethrough into benzene and hydrogen, feeding hydrogen containing deuterium to said hot unit, causing deuterium-depleted hydrogen leaving said cold unit to react with benzene leaving said hot unit to form cyclohexane, feeding said last named cyclohexane to said cold unit and withdrawing deuterium-enriched hydrogen from the stream of hydrogen leaving said hot unit.

4. The method of concentrating deuterium in one of the two substances cyclohexane and hydrogen by a hydrogen isotope exchange reaction between said two substances which comprises establishing a countercurrent flow of cyclohexane and hydrogen in a series of pairs of exchange units, mixing said cyclohexane and hydrogen in each of said exchange units to cause an exchange of hydrogen isotopes between said two substances, maintaining one unit of each pair at a relatively low temperature to cause the cyclohexane flowing therethrough to be enriched with respect to deuterium, maintaining the other exchange unit of each pair at a relatively high temperature to cause hydrogen flowing therethrough to be enriched with respect to deuterium and also to cause cyclohexane flowing therethrough to be decomposed into hydrogen and benzene, hydrogenating the benzene leaving the high temperature unit of each of said pairs to form cyclohexane, returning said last named cyclohexane to the low temperature unit of each of said pairs, and removing a deuterium enriched product from the point between the last pair of exchange units of said series.

5. The method of concentrating deuterium in one of the two substances cyclohexane and hydrogen by a hydrogen isotope exchange reaction between said two substances which comprises establishing a countercurrent flow of cyclohexane and hydrogen in a series of pairs of exchange units, mixing said cyclohexane and hydrogen in each of said exchange units to cause an exchange of hydrogen isotopes between said two substances, maintaining one unit of each pair at a relatively low temperature to cause the cyclohexane flowing therethrough to be enriched with respect to deuterium, maintaining the other exchange unit of each pair at a relatively high temperature to cause hydrogen flowing therethrough to be enriched with respect to deuterium and also to cause cyclohexane flowing therethrough to be decomposed into hydrogen and benzene, hydrogenating the benzene leaving the high temperature unit of each of said pairs to form cyclohexane, returning said last named cyclohexane to the low temperature unit of each of said pairs, transferring deuterium-enriched hydrogen from each of said pairs of exchange units to the next succeeding pair of exchange units and returning deuterium-depleted hydrogen from each of said pairs of exchange units to the next preceding pair of exchange units.

6. The method of concentrating deuterium in one of the two substances cyclohexane and hydrogen by a hydrogen isotope exchange reaction between said two substances which comprises establishing a countercurrent flow of cyclohexane and hydrogen in a series of pairs of exchange units, mixing said cyclohexane and hydrogen in each of said exchange units to cause an exchange of hydrogen isotopes between said two substances, maintaining one unit of each pair at a relatively low temperature to cause the cyclohexane flowing therethrough to be enriched with respect to deuterium, maintaining the other exchange unit of each pair at a relatively high temperature to cause hydrogen flowing therethrough to be enriched with respect to deuterium and also to cause cyclohexane flowing therethrough to be decomposed into hydrogen and benzene, hydrogenating the benzene leaving the high temperature unit of each of said pairs to form cyclohexane, returning said last named cyclohexane to the low temperature unit of each of said pairs, transferring deuterium-enriched hydrogen from each of said pairs of exchange units to the next succeeding pair of exchange units, returning deuterium-depleted hydrogen from each of said pairs of exchange units to the next preceding pair of exchange units and removing as product deuterium-enriched hydrogen from the last pair of exchange units of said series.

References Cited in the file of this patent

Sattler: The Solubility of Hydrogen in Liquid Hydrocarbon, Chemical Abstracts, vol. 36, page 18 (1942).

Farkas: Nature, volume 143, page 244 (1939).